US010885276B2

(12) United States Patent
Kartoun et al.

(10) Patent No.: US 10,885,276 B2
(45) Date of Patent: Jan. 5, 2021

(54) DOCUMENT CLEARANCE USING BLOCKCHAIN

(71) Applicant: INTERNATIONAL BUSINESS MACHINES CORPORATION, Armonk, NY (US)

(72) Inventors: Uri Kartoun, Cambridge, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/108,370

(22) Filed: Aug. 22, 2018

(65) Prior Publication Data
US 2020/0065380 A1    Feb. 27, 2020

(51) Int. Cl.
| G06F 40/30 | (2020.01) |
| G06K 9/62 | (2006.01) |
| H04L 9/06 | (2006.01) |
| G06N 20/00 | (2019.01) |
| G06F 16/27 | (2019.01) |
| G06F 16/182 | (2019.01) |

(52) U.S. Cl.
CPC .......... *G06F 40/30* (2020.01); *G06F 16/182* (2019.01); *G06F 16/27* (2019.01); *G06K 9/6217* (2013.01); *G06N 20/00* (2019.01); *H04L 9/0637* (2013.01)

(58) Field of Classification Search
CPC ..... H04L 63/08; G06F 16/9535; G06F 21/12; G06F 40/30
See application file for complete search history.

(56) References Cited

U.S. PATENT DOCUMENTS

| 7,516,492 | B1 | 4/2009 | Nisbet et al. |
| 7,958,147 | B1* | 6/2011 | Turner .................. G06Q 10/10 |
| | | | 707/783 |
| 2003/0055848 | A1* | 3/2003 | Dickinson ............. G06Q 10/10 |
| 2009/0037214 | A1 | 2/2009 | Leonard et al. |
| 2010/0076957 | A1 | 3/2010 | Staddon et al. |
| 2015/0007264 | A1* | 1/2015 | Maldaner ........... H04L 67/1097 |
| | | | 726/3 |
| 2019/0050541 | A1* | 2/2019 | Wright ................ G06Q 20/123 |

OTHER PUBLICATIONS

De La Rosa et al., "A Survey of Blockchain Technologies for Open Innovation", https://www.researchgate.net/publication/321381169, Conference paper, Nov. 2017, pp. 1-27.
Gipp et al., "CryptSubmit: Introducing Securely Timestamped Manuscript Submission and Peer Review Feedback using the Blockchain", 2017 IEEE, pp. 1-4.

(Continued)

*Primary Examiner* — Feng-Tzer Tzeng
(74) *Attorney, Agent, or Firm* — L. Jeffrey Kelly (57) ABSTRACT

A method, computer system, and a computer program product for document clearance is provided. The present invention may include receiving content. The present invention may also include extracting the received content features. The present invention may then include determining a level of sensitivity based on the extracted content features. The present invention may further include identifying an approver based on the determined level of sensitivity. The present invention may also include transmitting the content to the identified approver.

20 Claims, 5 Drawing Sheets

(56) References Cited

OTHER PUBLICATIONS

Janze, "Design of a Decentralized Peer-To-Peer Reviewing and Publishing Market", Association for Information Systems, AIS Electronic Library (AISeL), ECIS 2017 Proceedings, http: //aisel.aisnet.org/ecis2017_rp, Jun. 10, 2017, pp. 1-14.
Sanchez et al., "Detecting sensitive information from textual documents: an information-theoretic approach", https://link.springer.com/chapter/10.1007/978-3-642-34620-0_17, MDAI 2012: Modeling Decisions for Artificial Intelligence pp. 173-184, 18 pages.
Tennant, A Mulit-Disciplinary Perspective on Emergent and Future Innovations in Peer Review [version 3, referees: 2 approved], F1000Research 2017, 6:1151 Last updated Nov. 29, 2017, pp. 1-64.
Mell et al., "The NIST Definition of Cloud Computing", National Institute of Standards and Technology, Special Publication 800-145, Sep. 2011, pp. 1-7.
Bradbury, "BlockSign Utilises Block Chain to Verify Signed Contracts", Aug. 27, 2014, 6 pages.
http://www.opensig.net/, "OPENSIG", Digital Signature Technology, Simple, Secure, Global, Accessed on May 26, 2020, 4 pages.
https://signatura.co/, "Electronic signature and certification based on Blockchain", The world's most secure and resilient electronic signature platform, Accessed on May 26, 2020, 1 page.

\* cited by examiner

DOCUMENT CLEARANCE USING BLOCKCHAIN

BACKGROUND

The present invention relates generally to the field of computing, and more particularly to document clearance. A document or a manuscript may undergo a submission process for clearance prior to a public release of the document at a conference or in a publication. A document that does not contain sensitive information may require a simple analysis prior to publication, however, a document that contains sensitive information may require additional layers of review.

SUMMARY

Embodiments of the present invention disclose a method, computer system, and a computer program product for document clearance. The present invention may include receiving content. The present invention may also include extracting the received content features. The present invention may then include determining a level of sensitivity based on the extracted content features. The present invention may further include identifying an approver based on the determined level of sensitivity. The present invention may also include transmitting the content to the identified approver.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for document clearance. As such, the present embodiment has the capacity to improve the technical field of document clearance by automating the document approval process for publication. More specifically, the document clearance process will save time and resources in an organization by using natural language processing (NLP) and machine learning (ML) to streamline, automate and simplify the approval process for various risk level (i.e., levels of sensitivity) documents before publishing. Additionally, the streamlined approval process will reduce the risk of an organization publishing confidential content and bring efficiency to publishing papers.

As previously described, a document, a research paper, a manuscript or an article may undergo a submission process for clearance prior to a public release of the document at a conference, in a publication or in an online archiving repository. A document that does not contain sensitive information may require a simple analysis prior to publication, however, a document that contains sensitive information may require additional layers of review.

Current document clearance systems may include manual processes that direct employee time towards coordinating the various approval process paths to publish a document depending on the level of document risk, the amount of sensitive information in the document and the amount of damage the textual content could cause an organization if the sensitive information was overlooked and published. Therefore, it may be advantageous to, among other things, simplify the digital content approval process for an organization by using natural language processing (NLP) to analyze the document and apply machine learning (ML) techniques to direct the document to proper approval committees. Incorporating blockchain technology into document clearance systems will achieve an increased efficiency of the approval process and will improve document security.

The use of blockchain or reusable blocks to store both a document and document signatures may improve efficiency by allowing a faster approval process as compared to traditional approval processes. Traditional data management approval frameworks lack a central authority and the lack of central authority slows down the approval process. Furthermore, since every approval signature is recorded and stored on a block and distributed over multiple nodes, the approval process is highly transparent and thus achieves an improved security.

Submitting a document, an article, a research paper or a manuscript using a document clearance system may save time and resources of an organization by reducing inter-organization communication to accomplish the task of document clearance. For example, automating the process using NLP and ML will reduce the numerous emails that may be transmitted between employees of a company to obtain the approval for document clearance, and additionally, will reduce the amount of memory or storage needed to store the emails and email document attachments on a company database.

According to at least one embodiment, prior to publication, a user may submit a document for approval for example, by uploading the stored document using a computer device. Once the user uploads and submits the document, NLP and ML may determine the appropriate person(s) or committee(s) who may be required to approve the document (i.e., approver, approval committee, committee, clearing authority, individual approver or approval person). By applying NLP and ML on each document, one or more blocks are either reused or created.

The document is then sent to one or more individuals or committees for approval. An approval person may also require revisions or an amendment of the document or may approve the document to be published. Alternatively, multiple required approvals may have access to the document for approval simultaneously. Documents with no risk content or a low level of sensitivity may require no approval or a single approval. Documents with potentially sensitive content or suspected with an increased risk may require a larger number of levels of approval compared to documents that may not contain sensitive content.

In an alternate embodiment, instead of a user uploading a document, a computational process may scan one or more documents stored locally on a hard drive or online in a cloud environment to determine the level of sensitivity of each stored document. By applying NLP and ML on each stored and scanned document, one or more blocks are either reused or created.

A user may include, for example, a writer, a researcher, an employee, a doctor, a lawyer or a student. A document may include various formats, such as a word processing format, a text format, an email format, a spreadsheet, an image or a PDF. A document may also be a term used to mean textual content. An audio or media format may also be submitted and, for example, dictation software may be used to create a document containing the content the user would like to submit for approval.

A document publication clearance system may provide, for example, a process for researchers to submit a manuscript draft for approval before submission to a journal or a public disclosure (e.g., a conference). A clearance request that may rely on high risk factors (e.g., sensitive personal information (SPI)), such as patient data or personal clinical data (i.e., protected health information (PHI)), may require several additional layers of review. Additional layers of review or approval may be requested. Layers of approval may include, for example, a marketing department, a technical advisor, a compliance board, a subject matter expert (SME), a Data Access and Compliance Board (DACB) or additional managers.

When assessing the level of approval needed for textual content to be made public, a document publication clearance program may assess an approval level based on a level of sensitivity of the document content and then rank the document content sensitivity in a range between no risk and high risk (i.e., a level of risk). Textual content with no or low risk may include standard content that would not be harmful to an organization if made available to the public. An organization may include, for example, a business, a law firm, a hospital, a government, an insurance company, a shipping company or an educational institution.

Textual content with high risk may include sensitive information that if made available to the public, could harm an organization. Sensitive information may include data or content, for example, containing a patient name, a pool of patients or clients used for research purposes, a specific population being used for research purposes or a specific network, such as a particular healthcare network database, used for research purposes. Based on the calculated level of sensitivity of the document (i.e., applying NLP and ML to a document to capture sensitive words, phrases or images), approver identities are determined for the required approval of the documents. Once the identities of the approvers are determined, the document may be broadcasted to the approvers in a blockchain network.

Using a blockchain network may allow approvers to access the document for review and approval. A particular distributed ledger may store multiple identities and approval decisions of approvers who have accessed the document (i.e., blocks). A new block may be added to the ledger once a clearing authority approves the document. The ledger may then be updated accordingly and then may be broadcasted to all approvers. A new block may also be added to the ledger when a clearing authority does not approve the document. In the case of a disapproval by at least one approver, the user may be required to revise and upload the document or manuscript for re-consideration. The ledger may be updated based on the blocks indicating approvals or disapprovals. In a desirable scenario to the user, the document may either be approved by all approvers immediately or revised and approved once all approvers are satisfied with the revised document.

An example of the document clearance process may include a user that creates a research paper for review. The user may upload the document from a work computing device to the document clearance program (i.e., document clearance system) that is stored on an employer database. The document clearance program may use an NLP feature extraction tool to extract features that are potentially correlated with an increased risk. The document and other documents with similar features may be analyzed based on their previous approval or rejection of the content. Then ML would be incorporated to calculate the level of sensitivity of the document. The level of sensitivity, for instance, could be in the range of 0 to 1 and 0 may indicate no risk and 1 may indicate that that document contains information that is very likely harmful to the organization.

The NLP feature extraction may be implemented or created by extracting documents from an organization corpus or database that stores, for example, research papers that have been previously analyzed and processed within the organization. The NLP extraction process may tag document features, such as patient identifiable data, sensitive words, names of individuals, names of technologies, names of companies or hospitals. Names of technologies may include, for example, IBM® Watson Health™ (IBM Watson Health and all IBM Watson Health-based trademarks and logos are trademarks or registered trademarks of International Business Machines Corporation and/or its affiliates) and IBM® Explorys® Network (IBM Explorys and all IBM Explorys-based trademarks and logos are trademarks or registered trademarks of International Business Machines Corporation and/or its affiliates).

For simple documents, the user may input details upon submission, such as contact information, copyright information, document classification (e.g., declassified) and the document may only require a first line or a second line manager approval. The text of the document may be analyzed to find features that may define a level of sensitivity or risk. A document with a higher level of sensitivity may include, for example, patient names that received care for a disease at a particular hospital facility.

Once the level of sensitivity is determined, a distributed ledger may be created. The ledger may then be distributed to different approvers whose identities are determined based on the level of sensitivity of the document. A new block may be added to the ledger once a clearing authority approves or disapproves the document. A block may also contain the contact information of a clearing authority (e.g., name, title, email address or biometric features such as a stored pupil or fingerprint scan). Additionally, the block may also contain the clearing authority's approval, revise or disapproval status. Once a block is added to the ledger, the ledger is broadcasted to all relevant approvers (i.e., clearing authority individuals or committees).

The text in a document may be processed and analyzed to determine the appropriate approval route and the document may also be transferred for approval and revisions across the blockchain network. Processing the textual content may, for example, result in the identification of required layers of approval, including specific departments, committees and specific employee names. Determining the number of levels needed for approval of a document and who the levels of approval are to be directed may be analyzed and then each person who may review and approve the document may be added to the blockchain. For example, if a technical advisor, a marketing director and a direct manager are required to approve a research paper prior to publication, the contact information for each of the approvers will be added to the blockchain for accessibility to the document for approval.

The document clearance system may refer to previously approved and previously unapproved documents and the corresponding roles (e.g., approver or user) that were associated with the document. Then, by using ML for a labeled dataset that was created and processed using NLP from an organization corpus or database, the previously similarly approved publications and the roles that were associated may place the document in an appropriate chain of approvals for document clearance. ML may create an automated basis (i.e., automated approval learning) for future documents that were annotated using NLP when uploaded by a user. ML may use, for example, a particular organization ontology to learn the structure of an organization, the individuals in an organization and the individuals' approval roles within the organization.

NLP may analyze the characteristics of a candidate document, such as a research paper, a press release or marketing material to identify approver identities that may be dynamically added to the blockchain. For example, if PHI data is detected in the scanned and stored document, research or manuscript uploaded by the user, or computationally scanned document as in the alternate embodiment, then the document clearance system may retrieve the previously saved and approved document that contains a similar level of sensitivity as the uploaded document. The document clearance system may suggest adding similar approver(s) to the blockchain as the approvers associated with the previously approved document. Faster and improved performance of the document clearance system may be achieved by the dynamically suggested similar approvers for continual and future use.

NLP and ML applied on the content of the document may identify an appropriate list of clearing authority individuals necessary to approve the uploaded document. The identified clearing authority individuals may then be added to the blockchain network. Use of a distributed ledger in blockchain technology may increase transparency of the document approval process. For example, once a document is uploaded by a user, the document progresses towards an approval, towards prohibiting the document from publication or towards a request to revise and during the approval process, all approvers are aware of the actions being taken by other approvers as well as by the user.

An example of sensitive content may include a medical research paper that discusses a prediction model of a mortality rate of patients with a particular disease (e.g., cancer or cirrhosis) using a population of patients within a city (e.g., Boston or New York City) and in specific hospitals within the city. Another example of sensitive content may include verbiage in the medical research paper that discusses being granted access to electronic medical records (EMRs) of individuals in a particular health care data management repository, such as IBM® Explorys®.

The document clearance system may analyze the uploaded document and may be automated to propose who may be an approval participant in the blockchain. The approval participant may not need to be pre-defined or specified by a user. Dynamically identifying who an approver individual may be by the title of the individual within a company may be automated, for example, without needing to specify a particular name of an individual.

Figure 1:
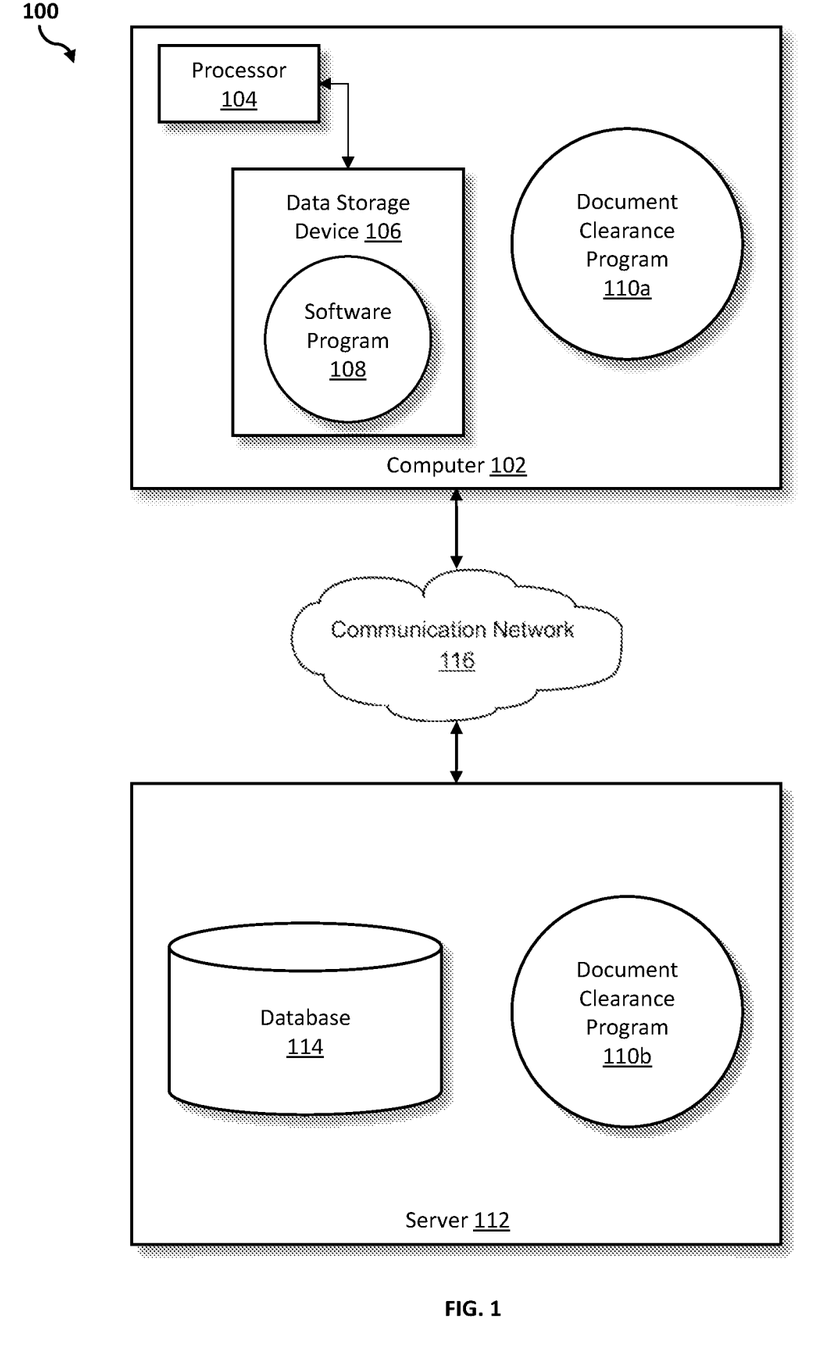
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a document clearance program 110a. The networked computer environment 100 may also include a server 112 that is enabled to run a document clearance program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the document clearance program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the document clearance program 110a, 110b (respectively) to create automated approval learning for document clearance. The document clearance method is explained in more detail below with respect to FIG. 2.

Figure 2:
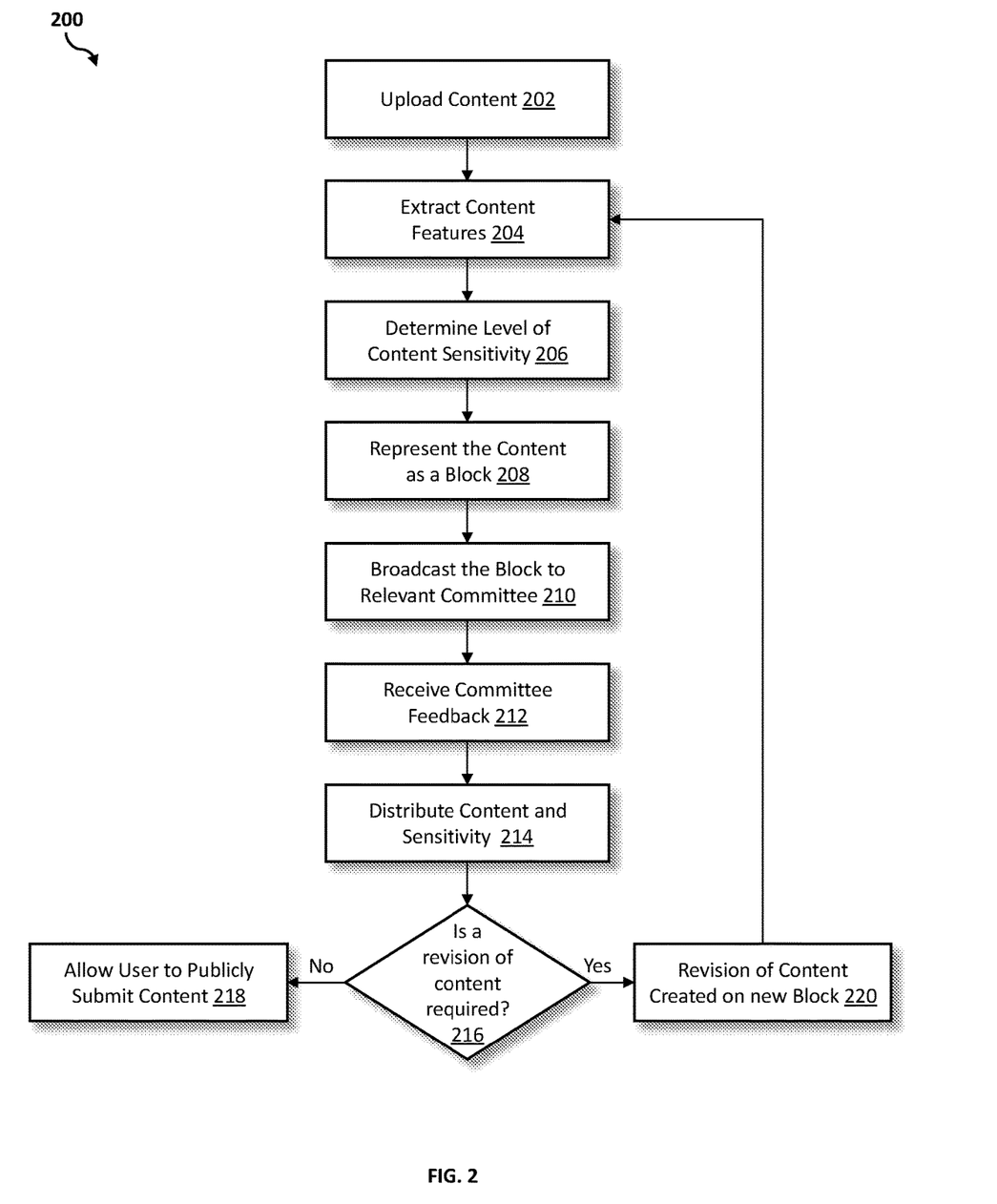
FIG. 2 is an operational flowchart illustrating a process for document clearance according to at least one embodiment.

Referring now to FIG. 2, an operational flowchart illustrating the exemplary document clearance process 200 used by the document clearance program 110a, 110b according to at least one embodiment is depicted.

At 202, content is uploaded. A user may upload content using various computing devices, such as a computer, a smart phone, a tablet or a smart watch. A user may also upload content via speech to text software that allows the user to speak into a microphone on a computing device and the voiced content is translated to a text format. The content a user may upload may be, for example, an article for publication in a magazine or a journal in various fields such as medical, art, business, legal, policy, legislative, agriculture, science or technical.

Next, at 204, content features are extracted. The document may be analyzed using NLP for content feature extraction. The document clearance program 110a, 110b may receive both structured data and unstructured data. Structured data may include data that is highly organized, such as a spreadsheet, relational database or data that is stored in a fixed field. Unstructured data may include data that is not organized and has an unconventional internal structure, such as a textual paragraph, a table, a chart, a figure, an image, a presentation, a webpage, video content, audio content, an email or multimedia content. The received data may be processed through NLP to extract information that may represent the level of sensitivity of the document. NLP and ML algorithms may be applied to the uploaded document and to historical documents that were reviewed in the past, whether approved or disapproved.

Features that may be extracted may include features pertaining to, for example, document content type and an organization or corporate structure type (e.g., using an ontology for the particular corporation type). For example, features in a medical or scientific research paper being submitted for publication at a medical facility. The extracted relevant document content features may include geographic locations of test results, specific populations, specific hospital facilities and specific diseases. The extracted relevant organization structure may include doctors at the facility who have treated the specific disease, hospital management in specific care of a disease or a hospital employee who has researched or lived in the researched geographic locations.

NLP content features may also include, for example, titles of specific institutions within a context of potential sensitive data, such as a patient population who received care at the specific institution. Content that may include methods, such as Latent Dirichlet Allocation (LDA) and Latent Semantic Analysis (LSA) may be used to identify correlations between words and sentences within the context of document sensitivity.

Incorporating specific representations of keywords to indicate an increased document sensitivity (i.e., incorporating more than one keyword) may improve the accuracy and credibility of data processing methods (e.g., LDA and LSA). Identifying specific expressions could be achieved by following a simple human-in-the-loop step to "nail" the expressions (e.g., Last Name, First Name, text nailing: an efficient human-in-the-loop text-processing method, Magazine X 2017; 24(6):44-49). Incorporating nailed representations into the feature extraction algorithms applied on the documents may be expected to identify features that more accurately represent the level of sensitivity of the documents.

Then, at 206, the level of content sensitivity is determined. Risk factors (i.e., a level of sensitivity) may be analyzed in each document and appropriate approvers may be dynamically allocated based on the sensitivity level. Determining the level of sensitivity may include applying a ML algorithm, for example, on a large collection of documents including features extracted from the documents and the level of sensitivity of each document. The level of sensitivity could be labeled binary (e.g., sensitive or non-sensitive), multi-categorical (e.g., highly-sensitive, mildly-sensitive or non-sensitive) or a continuous value (e.g., ranging from 0=non-sensitive to 1=highly-sensitive). Applying the ML algorithm on other documents and the other documents corresponding labels may create a classification model. The classification model may include a data structure that represents associations between a set of features and the set of features corresponding labels. For a new document and the corresponding features of the new document, using a classification model may allow the calculation of the sensitivity level of that document.

Determining appropriate approvers may include a variety of the organization's personnel, committees and departments. Different sensitivity levels may be associated with different layers of approvers. For instance, sensitivity in the range of 0 to 0.2 will only require the approval of the direct manager of the user. Sensitivity higher than 0.2 and below 0.4 will require the direct manager approval of the user and the manager of the manager's approval of the user. Sensitivity higher than 0.4 and below 0.6 will require additional layers of approval, such as a DACB, a technical advisor and the marketing department. Sensitivity that is above 0.9 will result in a prohibition of publishing the document.

A document may, for example, be stored in a database (e.g., database 114). Additionally, the calculated level of sensitivity (i.e., sensitivity score) may also be stored in an organization database. The stored sensitivity score may assist in automating the document clearance process by, for example, the document being labeled and stored as public or private information by an administrator. The sensitivity score may be used at a later time to assist in deciding if other particular documents may be appropriate for publication. Additionally, a sensitivity score for a given document may vary over time. For example, a document stored in the military historical archives may be sensitive at a certain point in time (e.g., during World War II), but may no longer be sensitive in the present time.

At 208, the content is represented as a block. A block may be a representation of the document content, the document's calculated level of sensitivity and valid transactions as in standard blockchain frameworks.

Next, at 210, the block is broadcasted to a relevant committee or approver. The number of relevant approvers may vary depending on the uploaded textual content (e.g., document, marketing material, research paper or a manuscript). For example, simple content that contains a low risk level may require one approver to review the content before publication. Alternatively, a determined high-risk document may require multiple approvers or committees to review, such as subject matter experts (SMEs), marketing departments and managers, prior to publication. The risk content may be associated with the level of harm the content could cause to an organization if the content is published, such as an identity of a patient. The user identity and content sensitivity level may be distributed to the relevant committee or the multiple relevant committees for approval.

Identifying a specific individual approver based on the approver clearing authority may be determined based on the individual approver role and the document sensitivity level. The relevant approver may be determined by the level of sensitivity of the document. For example, the appropriate or relevant personnel required to approve an article for publication may include multiple departments, committees and managers if the document sensitivity score is above a pre-defined threshold.

Then, at 212, the committee feedback is received. An individual approver or a committee may approve the document for publication, may require amendments or revisions to the document prior to publication or may deny the document for publication. The document clearance program 110a, 110b interface may allow the individual approver to access the document, amend the document or write notes in the document for the user or other individual approvers to view and provide input. The notes, document or amended document may be stored in a database or on a block (e.g., a reusable block) in a blockchain network. Approver feedback may be accessed by the user only or may be accessible to the user and some or all approval individuals relevant to the document as associated in step 206.

At 216, the document clearance program 110a, 110b determines if revision of the content is required. Revision of content is determined by the feedback produced and received at step 212. If an approver provides feedback that requires changes to the document before approval for publication, then a revision may be necessary. If the document is approved by the individual providing approval or the multiple individuals providing approval, then no revisions of the documents may be required before publication.

If a revision of the content is not required at 216, the document clearance program 110a, 110b allows the user to publicly submit the document content at 218. If the document is approved, with or without requiring amendments, and each approver has allowed the document to go to publication, with or without revisions, then the document may be made available for the user to publicly submit or share. Public submission may be in the form, for example, of a publication, a conference, a meeting or a public disclosure of the document. Actions taken by approvers regarding the revised document may be added to the original ledger.

If a revision of the content is required at 216, the document clearance program 110a, 110b will create a new block for the revision of the content at 220. If an approver required an amendment or revision to the document before publication, then the revised content is created on a new block at 220. The revised content may be provided by the approver or the user. The revised content may include, for example, track changes in a document or a comment or notes written in a document by the approver. The revised content may also include, for example, an edited and updated document created by the user who based the edits on either a non-approval status or based the edits on comments or notes from a clearing authority. Revisions may be provided by the user and may be accessible to the designated approvers. Once the user has updated or revised the document, the document clearance program 110a, 110b process may begin again at step 204 when content features are extracted again based on the amended portions of the document.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
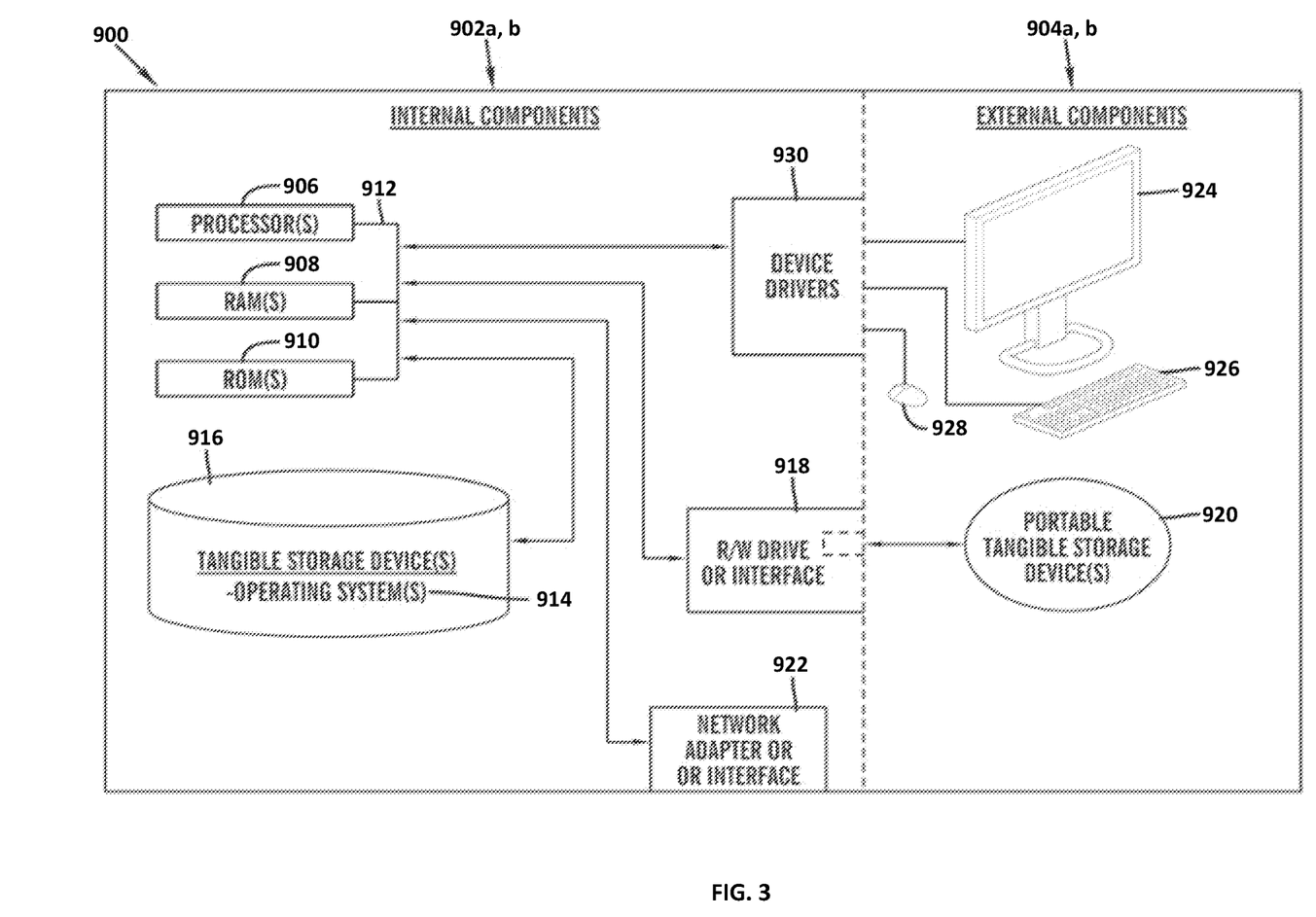
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the document clearance program 110a in client computer 102, and the document clearance program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the document clearance program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the document clearance program 110a in client computer 102 and the document clearance program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the document clearance program 110a in client computer 102 and the document clearance program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
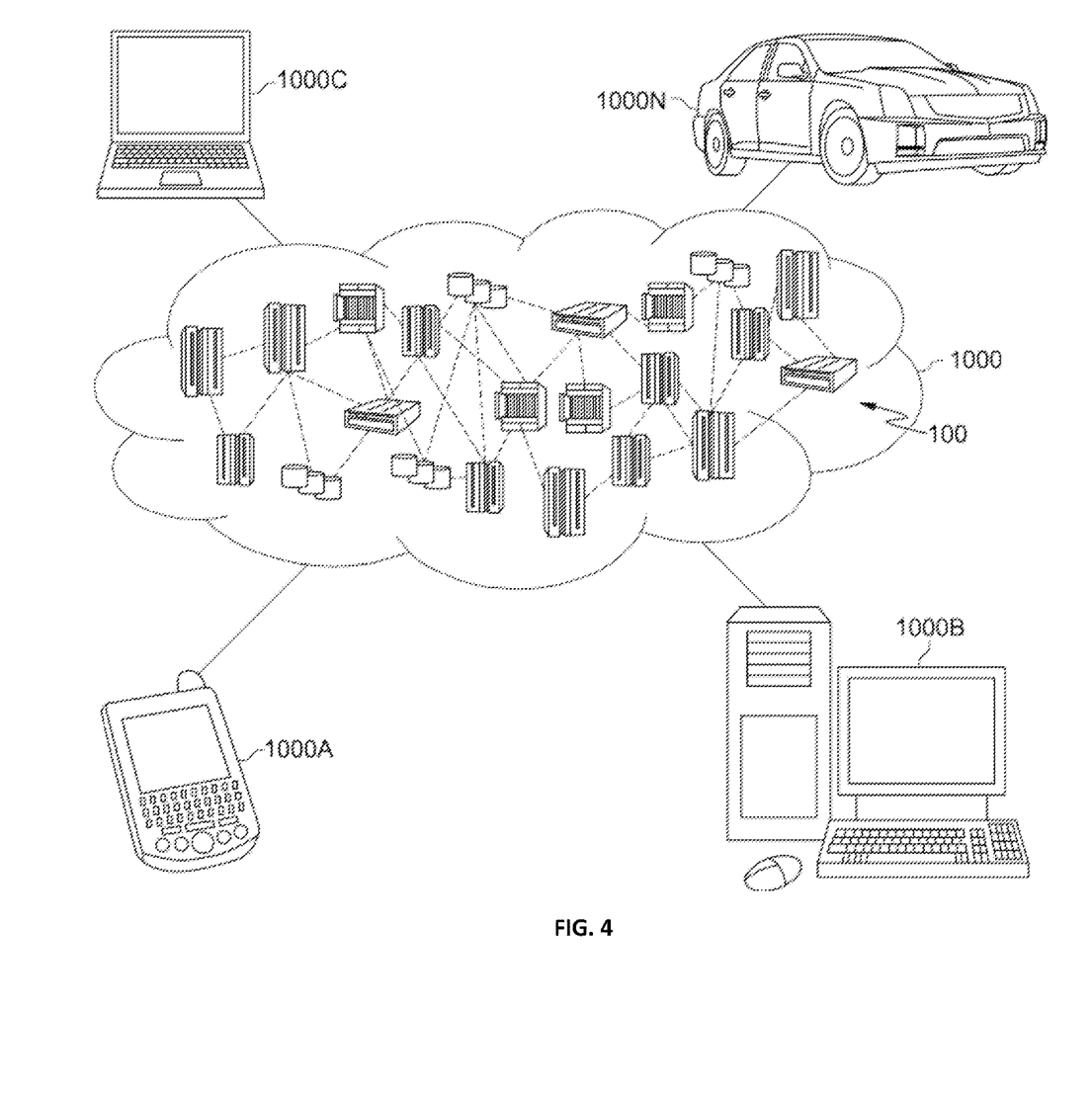
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
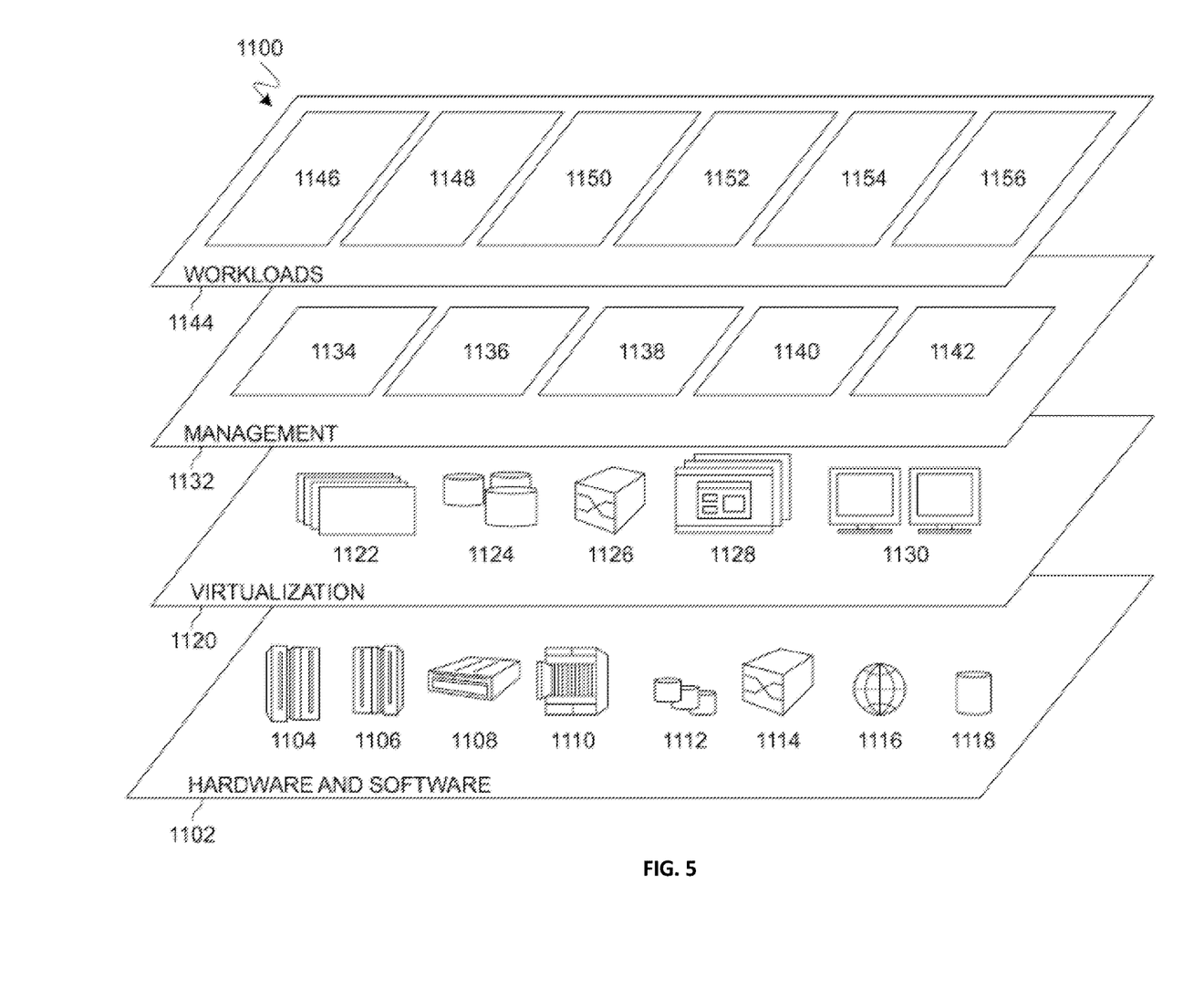
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and document clearance 1156. A document clearance program 110a, 110b provides a way to create an automated approval learning process for documents that may be published for an organization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for document clearance, the method comprising:
   receiving content;
   extracting features of the received content using natural language processing;
   determining a level of sensitivity based on the extracted content features;
   adding or reusing a block on a distributed ledger that contains accessibility to the content once a clearing authority approves the content;
   identifying one or more approvers based on the determined level of sensitivity using machine learning; and
   broadcasting on the distributed ledger to the one or more approvers, wherein the one or more approvers are given access to the block.

2. The method of claim 1, further comprising:
   receiving feedback from the one or more approvers based on the received content;
   determining that the feedback requires a revision; and
   updating the distributed ledger to contain a decision of the one or more approvers.

3. The method of claim 1, further comprising:
   receiving feedback from the one or more approvers based on the content and the level of sensitivity;
   determining that the feedback does not require a revision; and
   allowing a user to publicly disclose the content.

4. The method of claim 1, wherein the received content is selected from a group consisting of a research paper, a manuscript, a document or an article.

5. The method of claim 1, wherein the block is stored on a blockchain network.

6. The method of claim 1, wherein the level of sensitivity is determined by using a classification model that was trained using a plurality of content, wherein the classification model includes a data structure that represents associations between a set of features and a set of corresponding features labels.

7. The method of claim 1, wherein the one or more approvers are determined based on the level of sensitivity and by using the machine learning to learn an ontology structure of an organization, wherein the one or more approvers have a specific role within the organization.

8. A computer system for document clearance, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   receiving content;
   extracting features of the received content using natural language processing;
   determining a level of sensitivity based on the extracted content features;

adding or reusing a block on a distributed ledger that contains accessibility to the content once a clearing authority approves the content;

identifying one or more approvers based on the determined level of sensitivity using machine learning; and broadcasting on the distributed ledger to the one or more approvers, wherein the one or more approvers are given access to the block.

9. The computer system of claim 8, further comprising:

receiving feedback from the one or more approvers based on the received content;

determining that the feedback requires a revision; and updating the distributed ledger to contain a decision of the one or more approvers.

10. The computer system of claim 8, further comprising:

receiving feedback from the one or more approvers based on the content and the level of sensitivity;

determining that the feedback does not require a revision; and allowing a user to publicly disclose the content.

11. The computer system of claim 8, wherein the received content is selected from a group consisting of a research paper, a manuscript, a document or an article.

12. The computer system of claim 8, wherein the block is stored on a blockchain network.

13. The computer system of claim 8, wherein the level of sensitivity is determined by using a classification model that was trained using a plurality of content, wherein the classification model includes a data structure that represents associations between a set of features and a set of corresponding features labels.

14. The computer system of claim 8, wherein the one or more approvers are determined based on the level of sensitivity and by using the machine learning to learn an ontology structure of an organization, wherein the one or more approvers have a specific role within the organization.

15. A computer program product for document clearance, comprising:

one or more computer-readable tangible storage media and program instructions stored on at least one of the one or more computer-readable tangible storage media, the program instructions executable by a processor to cause the processor to perform a method comprising:

receiving content;

extracting features of the received content using natural language processing;

determining a level of sensitivity based on the extracted content features;

adding or reusing a block on a distributed ledger that contains accessibility to the content once a clearing authority approves the content;

identifying one or more approvers based on the determined level of sensitivity using machine learning; and broadcasting on the distributed ledger to the one or more approvers, wherein the one or more approvers are given access to the block.

16. The computer program product of claim 15, further comprising:

receiving feedback from the one or more approvers based on the received content;

determining that the feedback requires a revision; and updating the distributed ledger to contain a decision of the one or more approvers.

17. The computer program product of claim 15, further comprising:

receiving feedback from the one or more approvers based on the content and the level of sensitivity;

determining that the feedback does not require a revision; and allowing a user to publicly disclose the content.

18. The computer program product of claim 15, wherein the received content is selected from a group consisting of a research paper, a manuscript, a document or an article.

19. The computer program product of claim 15, wherein the block is stored on a blockchain network.

20. The computer program product of claim 15, wherein the level of sensitivity is determined by using a classification model that was trained using a plurality of content, wherein the classification model includes a data structure that represents associations between a set of features and a set of corresponding features labels.

* * * * *